(12) United States Patent
Goto

(10) Patent No.: US 7,583,310 B2
(45) Date of Patent: Sep. 1, 2009

(54) TAKING APPARATUS

(75) Inventor: Hisashi Goto, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 449 days.

(21) Appl. No.: 11/698,651

(22) Filed: Jan. 26, 2007

(65) Prior Publication Data

US 2007/0177047 A1   Aug. 2, 2007

(30) Foreign Application Priority Data

Jan. 31, 2006   (JP)   ............................. 2006-022795

(51) Int. Cl.
H04N 5/262   (2006.01)
H04N 5/225   (2006.01)
G02B 13/16   (2006.01)
G02B 15/14   (2006.01)
G02B 9/00   (2006.01)
G02B 9/08   (2006.01)
G03B 13/00   (2006.01)

(52) U.S. Cl. .................... 348/347; 348/240.3; 348/335; 348/345; 359/676; 359/739

(58) Field of Classification Search ............ 348/240.99, 348/240.3, 335, 340, 345, 347, 357, 363; 359/676, 683–684, 738–740
See application file for complete search history.

(56) References Cited

U.S. PATENT DOCUMENTS

| 7,075,732 B2* | 7/2006 | Watanabe et al. ............ 359/689 |
| 7,212,242 B2* | 5/2007 | Watanabe et al. ............ 348/357 |
| 7,236,307 B2* | 6/2007 | Noguchi et al. ............. 359/687 |
| 7,457,047 B2* | 11/2008 | Noguchi et al. ............. 359/687 |
| 2003/0103157 A1* | 6/2003 | Watanabe et al. ............ 348/360 |
| 2008/0291297 A1* | 11/2008 | Watanabe et al. ........ 348/240.3 |

* cited by examiner

Primary Examiner—Sinh Tran
Assistant Examiner—Daniel M Pasiewicz
(74) Attorney, Agent, or Firm—Kenyon & Kenyon LLP

(57) ABSTRACT

The present invention concerns an imaging apparatus which works for size reductions, power savings, the efficient attainment of the quantity of light sensed, and prevention of contrast decreases due to a diffraction phenomenon, is well fit for the taking and appreciation of common still pictures, and comprises a taking lens and electronic imaging device combination that takes full advantage of the characteristics of an imaging device. The imaging apparatus comprises a taking optical system, and an electronic imaging device which is located on an image side of said taking optical system, includes an imaging plane I with a plurality of two-dimensionally arranged light sensors, and is adapted to convert an image formed through said imaging optical system into electrical signals. In at least one taking state, the apparatus satisfies at the same time condition (1) about relations of the area of the entrance pupil to the focal length of the taking optical system, condition (2) about the number of effective pixels of the imaging plane, condition (3) about the effective area of the imaging plane, and condition (4) about the division of the effective area of the imaging plane by the number of effective pixels.

13 Claims, 7 Drawing Sheets

TAKING APPARATUS

This application claims benefit of Japanese Application No. 2006-22795 filed in Japan on Jan. 31, 2006, the contents of which are incorporated by this reference.

BACKGROUND OF THE INVENTION

The present invention relates generally to a taking apparatus comprising an imaging optical system and an electronic imaging device such as CCD or CMOS, and more particularly to a digital camera or a video camera capable of reproducing still pictures.

There has been an imaging apparatus known so far in the art, which makes use of an electronic imaging device such as CCD or CMOS, and converts an image formed through a taking optical system into electrical signals for recording, display, printing or other purposes.

Such imaging apparatus have now a lot more versions from a single-lens reflex camera adapted to take still pictures in a full-scale way to a compact camera designed to be readily carried around due to its compactness.

Of these, the so-called digital single-lens reflex camera incorporates an electronic imaging device of large size. This digital single-lens reflex camera, if it is used in combination of a large imaging plane with a taking lens having a reduced F-number, could have a particularly shallow depth of field so that artistic or sophisticated pictures can be obtained, and make it easy to check up a focus position through focusing by manual operation.

On the other hand, the compact camera is known to have pixels suitable for the taking and appreciation of still pictures. Such a compact camera is a camera system having a lot going for users who intend to mainly take common pictures without taking care of photograph arts or large posters or pictures for recording and appreciating purposes.

Among possible scenes taken, appreciated and enjoyed personally by common users, there would be time tables or other texts, map information or the events to be memorized, reminiscences or impression incidental to travels, events, etc., and the process of how children grow.

With the digital single-lens reflex camera, however, it is still difficult to downsize the whole system if the demanded image qualities and functions are factored in.

Among small-format electronic imaging device-incorporating imaging apparatus known so far in the art, there is a small-format video camera, or a compact digital camera mainly adapted to take still pictures. An imaging plane having a reduced area works for downsizing the whole size of the optical system, because even a taking lens having the same angle of view can have its focal length made short.

The former video camera of small size uses pixels only enough to maintain image quality during the taking of moving pictures or a limited number of substantial pixels, and so resolution per frame is insufficient and image quality is not worth still pictures as yet.

On the other hand, most compact digital cameras have pixels enough to take and appreciate common still pictures.

However, when it is intended to obtain pixels enough to allow for appreciation of good still pictures by use of a small-format electronic imaging device, the quantity of light sensed per pixel of the electronic imaging device tends to diminish and an exposure time tends to become long, rendering camera movement or subject movement likely to occur.

A limited imaging plane causes contrast to decrease under the influence of diffraction on the taking optical system and, hence, the image-formation capability of the taking optical system to become worse.

SUMMARY OF THE INVENTION

In view of the aforesaid problems, the present invention has for its object the provision of an imaging apparatus which works for size reductions, power savings, the efficient attainment of the quantity of light sensed, and prevention of contrast decreases due to a diffraction phenomenon, is well fit for the taking and appreciation of common still pictures, and comprises a taking lens and electronic imaging device combination that takes full advantage of the characteristics of an imaging device.

According to one aspect of the invention, the aforesaid object is achievable by the provision of a taking apparatus, comprising a taking optical system and an electronic imaging device which is located on an image side of said taking optical system, includes an imaging plane with a plurality of two-dimensionally located light sensing elements, and is adapted to convert an image formed through said taking optical system into electrical signals, characterized by satisfying the following conditions (1), (2), (3) and (4) at the same time in at least one taking state:

$$1/2.8 > (S_e/\pi)^{1/2}/f > 1/4.4 \qquad (1)$$

$$2.2 \times 10^6 < N < 13 \times 10^6 \qquad (2)$$

$$5.5 \text{ mm}^2 < S_i < 32 \text{ mm}^2 \qquad (3)$$

$$2 \times 10^{-6} \text{ mm}^2 < S_i/N < 16 \times 10^{-6} \text{ mm}^2 \qquad (4)$$

where:

$S_e$ is the area of the entrance pupil of the taking optical system in at least one taking state, f is the focal length of the taking optical system in said at least one taking state, N is the number of effective pixels of the imaging plane in said at least one taking state, and Si is the effective area of the imaging plane in said at least one taking state.

The arrangements of, and the requirements for, the taking system according to the invention are now explained.

The present inventors have paid particular attention to the NA of the taking optical system (F-number) as to how the quantity of light is most efficiently guided to the electronic imaging device: the present inventors have studied an efficient F-number and a compact taking system with that F-number.

In getting on with the present invention, the present inventors have made studies of an optical system which, while a diffraction phenomenon that is one factor of image quality deteriorations is factored in, is assumed to operate at a specific visual sensitivity based on 546.07 nm wavelength in a general state of use.

As regards the pixels of an electronic imaging device, there is an angle range of incident light where photoelectric conversion can take place. With light rays incident on the imaging device from outside this angle range, there is nothing sensed by the imaging device. That angle range is not necessarily a circular shape about its center axis; there is sometime an elliptical angle range that is wide in one direction and narrow in another direction. It should be noted that in order to be in good alignment with a chief ray for a taking lens, there is an angle range with its center axis tilting from the center toward the periphery of a screen.

As a consequence of studies, it is found effective to have at least one taking state where condition (1) is satisfied with respect to the relation of the area of the entrance pupil to the focal length of the taking optical system.

Exceeding the upper limit of 1/2.8 to condition (1) or, in another parlance, the entrance pupil growing large with respect to the focal length, is not preferable. This is because even when the quantity of light is increased by widening the angle range of incidence of light on the taking device, there is little increase in the quantity of light photoelectrically converted by the imaging device; nevertheless, there is an undue increase in difficulty with the construction of the taking optical system. In particular, there is a grave influence on high-order aberrations such as spherical aberration and coma, which may in turn give rise to an increase in the number of optical elements forming the optical system, and an increased demand for assembling precision as well.

As the lower limit of 1/4.4 to condition (1) is not reached or as the entrance pupil becomes small, the quantity of photo-electrically converted light decreases roughly in proportion to the area of the entrance pupil. As a result, there is a decrease in the quantity of light photoelectrically converted by the imaging device, which may possibly give rise to noises by reason of insufficient quantity of light, or camera or subject movement due to an extended exposure time. That the entrance pupil is small relative to the focal length also leads to diffraction at the taking optical system. When it comes to the effective area of the imaging plane defined by condition (3), there is diffraction having influences on that effective imaging area, which may possibly give rise to a decrease in image contrast.

Condition (2) is about the number of effective pixels of the imaging plane. The number of effective pixels here is understood to refer to the number of pixels included in the maximal area (called the effective imaging area) of the imaging plane of the electronic imaging device with a plurality of two-dimensionally arranged image sensors (pixels), which can be used for image recording, reproduction and printing.

The number of pixels of $2.2 \times 10^6$ is the minimal that makes an image of general print size (of about 13 cm in the long side) look like a natural one at the least distance of distinct vision. An image having the number of pixels less than that may be used for recording purposes, but it is not preferable as an image for appreciation viewing. In other words, falling short of the lower limit of $2.2 \times 10^6$ to condition (2) is not preferable, because there is resolution deterioration even with the so-called L print size. The upper limit of $13 \times 10^6$ is the optimal for the case where a screen, which has an aspect ratio of 3:2 and so renders it easy to take an image at a longitudinal position, is viewed at a longitudinal position and an extent of about 3% of the screen is provided to the field of view in the left-to-right direction to obtain self-oblivion with respect to the image.

In general, the extent of the field of view is said to be about 40° in the left-to-right direction. When a common screen with an aspect ratio of 3:2 is viewed at a lateral position and a distance almost equal to the field of view, the number of pixels is considered to be about $5 \times 10^6$ (with a pixel pitch of 0.015° as calculated on an angle-of-view basis). On the basis of this, an image is taken at a longitudinal position, and viewed on a screen that is about 3% longer in the left-to-right direction, from which the number of pixels, with which the viewer can plunge down into the image all oblivious to the edge of the screen (self-oblivion), is derived and set. This will be found from the following formula.

$$(5 \times 10^6) \times (3/2)^2 \times (1 + 0.03 \times 2)^2 = 13 \times 10^6$$

As regards the number of pixels, exceeding the upper limit of $13 \times 10^6$ to condition (2) makes no or little contribution to improvements in resolution: that is not preferable in terms of power consumption and throughput, except for special viewing conditions and image processing for, for instance, viewing commercial posters or the like, and serving commercial purposes unexpected for common users. Even when there is the number of pixels exceeding that upper limit with a decrease in the imaging area for compactness, any considerable image quality improvements are unexpected even by satisfying condition (1), because of the diffraction phenomenon. It is rather preferable that the number of pixels is limited while the quantity of light received per pixel is increased.

Condition (3) is about the effective area of the imaging plane. The effective area here is understood to mean the aforesaid effective imaging area.

The lower limit of 5.5 mm² to condition (3) is set as a value at which image quality is within acceptable limits and there is the maximal potential for size reductions obtained. Falling short of that lower limit is not preferable, because pixel size dwindles even though there is an effort to make sure of resolution, and so the quantity of light received per pixel diminishes. This renders noises likely to go over an image reproduced on a display or paper sheet. On the other hand, an extended exposure time, too, is not preferable because camera movement or subject movement is likely to occur. Further, the influences of diffraction grow large. For instance, consider an aberration-free taking lens system which has an F number of 2.2 considered to make sure a high photoelectric conversion efficiency with respect to a pupil and achieve well-balanced compactness. Here, a spatial frequency with an MTF of 50% becomes 313/mm (even the aberration-free lens decreases in MTF under the influence of diffraction). The minimal pixel pitch required to resolve the spatial frequency of 313/mm is calculated to be $$(1/313)/2 = 0.00159 \text{ (mm)} \tag{A}$$

The imaging area having $2.2 \times 10^6$ pixels, set up at that pixel pitch, becomes Si=5.5 mm². Here, as the MTF of the aberration-free lens goes down to less than 50%, noises are likely to occur even with processing adapted to enhance contrast by image processing, rendering gradation insufficient and failing to obtain sufficient image quality. The formulation of the resolution-to-pixel pitch relation as (A) would mean that there is no option but to use a limit value with no room for consideration of the influence of a low-pass filter and the influence of aberrations inclusive of fabrication errors. It should be noted that it is preferable to make the F-number less than 2.2, because MTF deterioration is further lessened and the exposure time is made short, so that image quality deterioration due to camera movement (shake) and subject movement can be eased. It is acceptable to keep the F-number less than 2.2 and make the pixel pitch finer; in the present invention, however, the value of 2.2 is used as the limit value from the following considerations.

Specifically, as the pixel pitch becomes too small, it would render it difficult to obtain a sensible tradeoff between making sure the transmission path structurally needed for the imaging device and making sure the photoelectric conversion plane of the light sensor, giving rise to a lot more deterioration factors such as noise in an image. In other words, it is not preferable to make the pixel pitch finer than that. To add up this, there is a much stricter demand for the absolute accuracy of the optical system. As a matter of course, however, this would not be the case with the advent of a new invention about the structure of an imaging device, and an invention capable of improving on the absolute accuracy of an optical system.

Exceeding the upper limit of 32 mm² to condition (3) may work for commercial purposes such as posters and photographic collections, but there is too large a size which may otherwise give rise to an increased camera system size and much power consumption unless the quantity of light is reduced by a half-silvered mirror located in an optical path. When $S_i=32$ mm² is used with $2.2 \times 10^6$ pixels, there is a pixel pitch of about 0.004 mm. At a frequency corresponding to a pixel pitch at F2.2, the MTF of the aberration-free lens is about 80%, almost a sufficient value with the post-taking image processing in mind. When screen size is increased with the same number of pixels, it causes the influence of diffraction to grow excessive. Even when a lot more pixels are used within the range of condition (2) and, with this, imaging device size is increased, there is no problem with image quality; however, this is not preferable on account of a lot more increased optical system size and a lot more increased power consumption for driving the optical system and imaging device. In the taking optical system, NA (effective F-number) decreases upon focusing from infinity onto a near distance, with incidental aberration changes. The amount of these changes is basically in association with magnification changes. In general, it is considered unlikely that the magnification change largely up to about 1/10. Consider here a carte-de-visite (for taking memorandums) as a common taking area. Then, when the upper limit is exceeded, the magnification is much greater than 1/10 upon the taking of a calling card. This is not preferable, because there are large loads on the optical system and image processing system. For instance, when a calling card (a long-side length of 90 mm) is taken with an enlarged center of a screen, the long side of a taking area inside a horizontal (vertical) 10 mm (about 10%) has a length of 70 mm. When the area of the imaging device is 32 mm² at an aspect ratio of 3:2, the long and short sides are 7 mm and 4.6 mm in length, respectively, and the magnification is 1/10.

When Si=32 mm², the number of pixels derived from the minimal pixel pitch needed for the resolution of 313/mm spatial frequency becomes $13 \times 10^6$, at which an image capable of making sure self-oblivion even at F2.2 can be taken. It should be noted that as the F-number is lower than F2.2 (the lower limit of condition (1)) within the range of condition (1), it enables the influence of diffraction to be lessened, thereby making allowance for resolution, and improving on gradation characteristics and expressive power. It is also possible to make short exposure times, thereby easing image quality of deterioration due to camera movement (shake), subject movement, etc. It is further possible to facilitate image processing for the reason of making sure of the quantity of light, thereby cutting down loads on image processing.

When the upper limit of condition (3) is not exceeded, there are spillover advantages obtained, such as the attainment of the depth of field, the lessening of the resolving power necessary for AF (automatic focusing), and ease of AF.

Condition (4) is about the imaging area (pixel area) per pixel, which is suitable to set up the system that satisfies conditions (1), (2) and (3).

Condition (4) is obtained by dividing the effective area of the imaging plane by the number of effective pixels, corresponding to the image area per pixel. As the lower limit of $2 \times 10^{-6}$ mm² is not reached, it causes the influence of diffraction to grow large, meaning that if a lot more pixels are used, it will lead immediately to image quality improvements. It is also not preferable, because the photoelectric conversion plane becomes small relative to the pixel area, resulting in a drop of photo-electric conversion efficiency. As the upper limit of $16 \times 10^{-6}$ mm is exceeded, imaging plane size becomes too large. On the other hand, reducing the imaging plane size is not preferable, because there is a resolution drop.

By designing the taking optical system and electronic imaging device in such a way as to satisfy these conditions (1) to (4), it is possible to set up an imaging apparatus that has the taking performance necessary for common users, and is of small size and less power consumptions.

It should be noted that less power consumptions mean that, with a battery of the same weight, there are a lot more photographs or a lot more taking chances. In other words, the same number of photographs could be obtained with a small, light battery. This is an important factor for the achievement of a camera of smaller, lighter size.

The present invention provides another taking apparatus, comprising a taking optical system, and an electronic imaging device which is located on an image side of said taking optical system, includes an imaging plane with a plurality of two-dimensionally arranged light sensors, and is adapted to convert an image formed through said taking optical system into electrical signals, characterized in that the following conditions (2), (3), (4), (5) and (6) are satisfied at the same time in at least one taking state:

$$1/1.4 > \Phi_{emax}/f > 1/2.2 \quad (5)$$

$$0.6 < \Phi_{emin}/\Phi_{emax} \leq 1 \quad (6)$$

$$2.2 \times 10^6 < N < 13 \times 10^6 \quad (2)$$

$$5.5 \text{ mm}^2 < S_i < 32 \text{ mm}^2 \quad (3)$$

$$2 \times 10^{-6} \text{ mm}^2 < Si/N < 16 \times 10^{-6} \text{ mm}^2 \quad (4)$$

where, given a horizontal direction defined by a long-side direction and a vertical direction defined by a short-side direction of an effective imaging area of said imaging plane, $\Phi_{emax}$ is the length of an entrance pupil in the longer of the horizontal and vertical directions, $\Phi_{emin}$ is the length of an entrance pupil in the shorter of the horizontal and vertical directions, f is the focal length of the taking optical system in said at least one taking state, N is the number of effective pixels of said imaging plane in said at least one taking state, and $S_i$ is the effective area of said imaging plane in said at least one taking state.

The advantages of, and the requirements for, the above arrangement of the taking apparatus are now explained.

In this taking apparatus, conditions (5) and (6) in place of condition (1) for the aforesaid first taking apparatus are specified as the requirements.

When it comes to a circular entrance pupil, condition (1) is replaced by the following one where $\Phi_e$ is the diameter of the entrance pupil.

$$1/1.4 > \Phi_e/f > 1/2.2$$

In other words, when the long-side direction of the effective imaging area of the imaging plane defines the horizontal direction and the short-side direction defines the vertical direction, condition (5) provides a definition of the length of the entrance pupil in the longer of the horizontal and vertical directions.

By satisfaction of condition (5), it is possible to take efficient hold of the quantity of light in the specified longer diametrical direction, cut down on the influences of diffraction, and leave imaging optical system size well-balanced.

The practical functions of the second taking apparatus are much the same as those of the first taking apparatus. In consideration of the fact that the angle range of incidence of light on the imaging device varies depending on whether the horizontal direction or the vertical direction, however, it is preferable to satisfy conditions (5) and (6). Although depending on the characteristics of the angle range of incidence of light on the imaging device, it is acceptable to use a non-circular aperture. In view of optical system design, its center portion in particular remains invariable, irrespective of whether the aperture is circular or oval. In view of assembling accuracy, however, the use of the oval aperture is sometimes favorable, because the area to be considered becomes narrow.

However, falling short of the lower limit of 0.6 to condition (6) is not preferable, because the degree of flatness of the entrance pupil grows too large to be compatible with the characteristics of the angle range of incidence of light on the imaging device, and the shorter diameter becomes smaller than required in view of making sure the quantity of light.

For the aforesaid taking apparatus, it is preferable to satisfy the following condition in said at least one taking state.

$$2\omega > 56.7° \quad (7)$$

Here, $\omega$ is a half angle of view upon taking in said at least one taking state.

Here assume that the entrance pupil of the taking optical system is circular and, at a position where the entrance pupil has the lower limit of condition (1) (or an F-number of 2.2), the full angle of view $2\omega$ is 56.7° ($\omega$ is the half angle of view upon taking). Then, the diameter of the entrance pupil becomes 40% of the diagonal length of the effective imaging area of the imaging device. Further, assume that the size of the aperture in the taking optical system is nearly equal to the size of the entrance pupil and a taking optical system-supporting frame structure has a length of 16% of the diagonal length of the effective imaging area at the periphery of the taking optical system (8% at the periphery of the aperture). Then, the size of the effective imaging area in the short-side direction can be close to the size of the frame structure so that the optical system can be generally compact.

In other words, with the area of the entrance pupil taking up about 30% of the effective area of the imaging plane, the size of the effective imaging area in the short-side direction becomes close to the size of the frame structure.

In general, the range of light beams through a taking optical system becomes narrowest at an aperture stop portion. An angle of view of $2\omega=56.7°$ (corresponding to a focal length of about 40 mm as calculated on the basis of a Leica format having an imaging plane size of 24 mm×36 mm) is one at which common pictures are taken within the range called a standard angle of view, and one that is empirically well balanced in view of optical system design and well fit for size reductions.

At a larger angle of view, the focal length becomes so small that the aperture stop can be diminished so as to make sure brightness. The larger the angle of view, the lesser frame structure size is susceptible of the influence of aperture stop size; however, the more largely it is affected by the spread of off-axis light beams. Thus, even when, on a wide-angle side, the entrance pupil relative to the focal length is increased so as to increase the quantity of light taken in, its influence on frame structure size increases is cut back.

On the other hand, when the angle of view is smaller than the standard angle of view, the spread of off-axis light beams becomes small, but frame structure size is more largely affected by aperture stop size.

Some problems still remain unsolved with the full length of the optical system and the number of lenses necessary for correction of aberrations; however, at a wide-angle region with the full angle of view $2\omega$ exceeding 56.7°, optical system size does not generally become small, even when the lower limit of condition (1) is not reached or the F-number is greater than the value of 2.2.

It is thus preferable to satisfy the aforesaid conditions (1) to (4) in at least one taking state where the full angle of view $2\omega$ is greater than 56.7° as defined by condition (7). This is because frame structure size does not increase anymore and nonetheless brightness is maintained.

In conditions (5) and (6) here, a condition for a flat entrance pupil, too, is taken into account. As far as the entrance pupil in the longer direction is concerned, however, the lower limit of condition (5) could be dealt with as is the case where the entrance pupil is circular and the F-number is 2.2.

It is thus preferable to satisfy the aforesaid conditions (2) to (6) in at least one taking state where the full angle of view $2\omega$ is greater than 56.7° as defined by condition (7). This because frame structure size does not increase anymore and nonetheless brightness is maintained.

For the aforesaid taking apparatus, it is also preferable to satisfy the following condition (8):

$$1 \geq T_e/T_{max} \geq 0.85 \quad (8)$$

Here, $T_e$ is a transmittance of e-line wavelength, and $T_{max}$ is a transmittance of a wavelength that becomes greatest among spectral transmittances of the taking optical system in a visible light region.

Condition (8) is necessary to take scenes or landscapes visible to humans in the natural world. The upper limit value of 1 is a theoretical limit that may not possibly be exceeded. As the lower limit of 0.85 is not reached, it is difficult to offer a tradeoff between color reproducibility and the quantity of exposure.

In this conjunction, it is preferable that the aforesaid taking optical system has a variable focal length, and that the aforesaid at least one taking state is one where the focal length of the aforesaid taking optical system becomes shortest.

In the invention, when the taking optical system is set up as a zoom optical system or an optical system having a plurality of selectable focal lengths as in the case with a vari-focus length optical system, it is preferable that the aforesaid requirements have been satisfied in the taking state where the focal length becomes shortest.

In a taking state on the wide-angle side, an image in the effective imaging area tends to have a high spatial frequency and, hence, a noticeable contrast decrease. For instance, on the wide-angle side where the taking angle of view becomes wide, there would be the recording of landscapes or the taking of commemorative photographs against the backdrop of scenes, where the contrast of a high spatial frequency on the imaging plane tends to grow large. On the telephoto side where the taking angle of view becomes narrow, on the other hand, there would be often the taking of a specific subject, where that subject is to be photographed largely, and the contrast of a high spatial frequency on the imaging plane tends to become low.

It is thus preferable that various conditions are satisfied in the taking state wherein the focal length becomes shortest, thereby lessening the influences of diffraction and cutting back on a contrast decrease.

It is then desired that the value obtained by dividing the area of the entrance pupil by the focal length becomes smaller in the taking state where the focal length of the aforesaid taking optical system becomes longest than in the taking state where the focal length becomes shortest.

As the focal length grows long, it causes the depth of field to become shallow and AF accuracy to become worse. It is thus preferable that, in the state where the focal length becomes longest, the area of the entrance pupil is smaller relative to the focal length, thereby making the F-number large and the depth of field deep and, hence, keeping AF accuracy.

It should be noted that on the telephoto side where the focal length grows long, the influences of diffraction are less noticeable, because even with an increased F-number, the spatial frequency characteristics of an image in the effective imaging area tend to become generally lower than those on the wide-angle side.

It is further desired that the aforesaid taking optical system is one designed to make correction of focusing misalignments in compliance with the distance to the subject, and the aforesaid at least one taking state is one where focus is placed on a subject located nearest to infinity.

When the taking optical system has a focusing function of making correction of focus position misalignments in compliance with the distance to the subject, it is preferable that such various conditions as mentioned above are satisfied in the taking state wherein focus is placed on the subject nearest to infinity.

On a near-distance side, there is no or little influence of diffraction even when the F-number is large, because the spatial frequency characteristics of an image in the screen become generally low on an infinite side.

In a taking state on the side nearest to infinity, on the other hand, the spatial frequency characteristics of an image in the effective imaging area tend to grow large with the result that there is a noticeable contrast decrease.

It is thus preferable to satisfy the various conditions in the taking state where focus is placed on the subject nearest to infinity, thereby holding back contrast decreases.

Further, it is desirable that the aforesaid taking optical system is a zoom lens and at least one taking state is one that satisfies the following condition (9):

$$75.4° > 2\omega > 56.7° \tag{9}$$

Here, $\omega$ is a half angle of view upon taking in said at least one taking state.

The range of condition (9) defines an angle-of-view region where there is a focal length of about 28 mm to about 40 mm, as calculated on a Leica format basis, and where there is often the taking of so-called commemorative photographs. For the zoom lens, it is preferable to satisfy the various conditions at any angle of view within the range of that condition, because commemorative photographs for good appreciation of memories can be taken.

In the aforesaid first taking apparatus, it is preferable that the aforesaid taking optical system is a zoom lens, wherein said zoom lens has a full angle of view 56.7° or greater at the wide-angle end, and it is preferable to satisfy the aforesaid conditions (1), (2), (3) and (4) at the same time, even when the aforesaid at least one taking state is provided by any taking state where there is a full angle of view of 56.7° or greater.

A taking state having a full angle of view of 56.7° or greater tends to have an increased contrast of high spatial frequency, and is an angle-of-view region as well, which is frequently used for common taking. Thus, if contrast decreases are held back in this angle-of-view region, it is preferable because high contrast can be maintained from low to high frequencies and exposure time can be made short.

In the aforesaid second taking apparatus, it is preferable that the aforesaid taking optical system is a zoom lens, wherein said zoom lens has a full angle of view 56.7° or greater at the wide-angle end, and it is preferable to satisfy the aforesaid conditions (2), (3), (4), (5) and (6) at the same time, even when the aforesaid at least one taking state is provided by any taking state where there is a full angle of view of 56.7° or greater.

As described just above, a taking state having a full angle of view of 56.7° or greater tends to have an increased contrast of high spatial frequency, and is an angle-of-view region as well, which is frequently used for common taking. Thus, if contrast decreases are held back in an angle-of-view region where there is a full angle of view exceeding 56.7°, it is preferable because high contrast can be maintained from low to high frequencies and exposure time can be made short.

For the aforesaid zoom lens, it is preferable to have a full angle of view of 75.4° or lower at the wide-angle end.

The size of the zoom lens in its diametrical direction tends to be affected by the light ray height of the outermost one of off-axis light beams near the wide-angle end. It is thus preferable that the full angle of view at the wide-angle view is set to 75.4° or lower, thereby reducing the effective diameter of the zoom lens and preventing the taking apparatus from becoming bulky.

Alternatively, the aforesaid taking optical system may be a single-focus lens that satisfies the following condition (9):

$$75.4° > 2\omega > 56.7° \tag{9}$$

Here, $\omega$ is a half angle of view upon taking in said at least one taking state.

The range of condition (9) defines an angle-of-view region where there is a focal length of about 28 mm to about 40 mm, as calculated on a Leica format basis, and where there is often the taking of so-called commemorative photographs and subjects often have a high spatial frequency. It is thus preferable to satisfy condition (9), because contrast decreases or light quantity decreases are held back in that angle-of-view range satisfying condition (9), so that commemorative photographs can be taken with image quality good enough to appreciate memories.

Yet alternatively, the aforesaid taking optical system may be adapted to make automatic correction of a focusing position misalignment in compliance with a distance to a subject, and the aforesaid at least one taking state may be any taking state which satisfies the following condition (9), and in which focus is placed on a subject nearest to infinity.

$$75.4° > 2\omega > 56.7° \tag{9}$$

Here, $\omega$ is a half angle of view upon taking in said at least one taking state.

The range of condition (9) defines an angle-of-view region where there is a focal length of about 28 mm to about 40 mm, as calculated on a Leica format basis, and where there is often the taking of so-called commemorative photographs or landscapes. In such taking, focus is placed on a far point side (almost at infinity). In such a taking state, an image within the effective imaging area tends to have an increased contrast of high spatial frequency, rendering a contrast decrease easily noticeable. It is thus preferable to take subjects in any one of such taking states while various conditions are satisfied, because image quality making sure good appreciation is obtained while any contrast decrease remains held back.

As described above, the present invention can provide an imaging apparatus which works for size reductions, power savings, the efficient attainment of the quantity of light sensed, and prevention of contrast decreases due to a diffraction phenomenon, is well fit for the taking and appreciation of common still pictures, and comprises a taking lens and electronic imaging device combination that takes full advantage of the characteristics of an imaging device.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
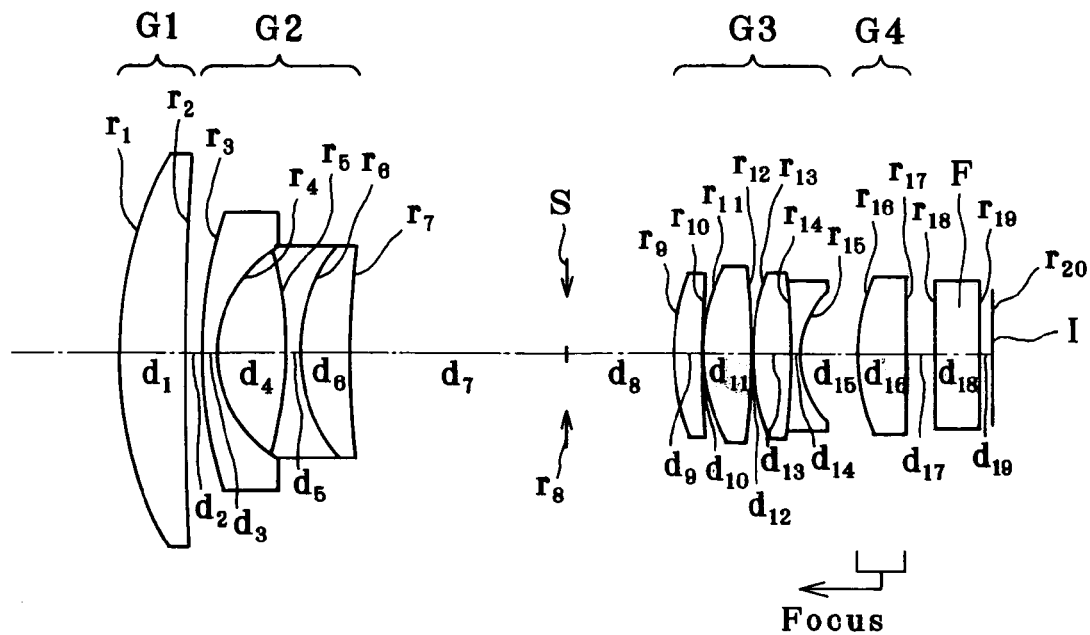
FIG. 1 is illustrative in section of Example 1 of the zoom lens used with the taking apparatus of the invention at a wide-angle end (a), in an intermediate setting (b), and at a telephoto end (c) upon focusing on an object at infinity.
Figure 1B:
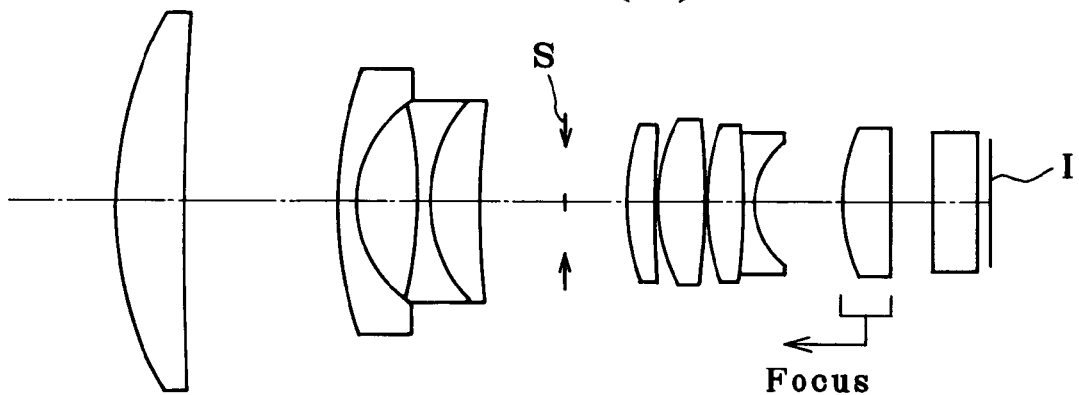
Figure 1C:
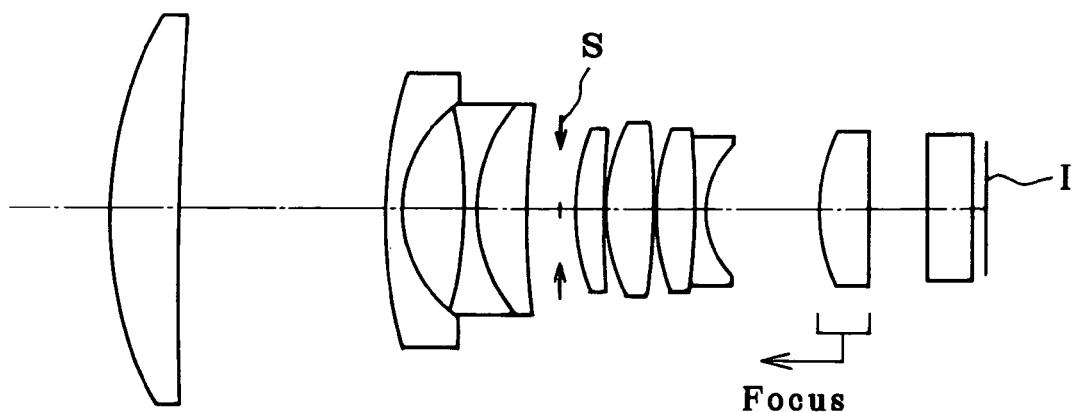
Figure 3:
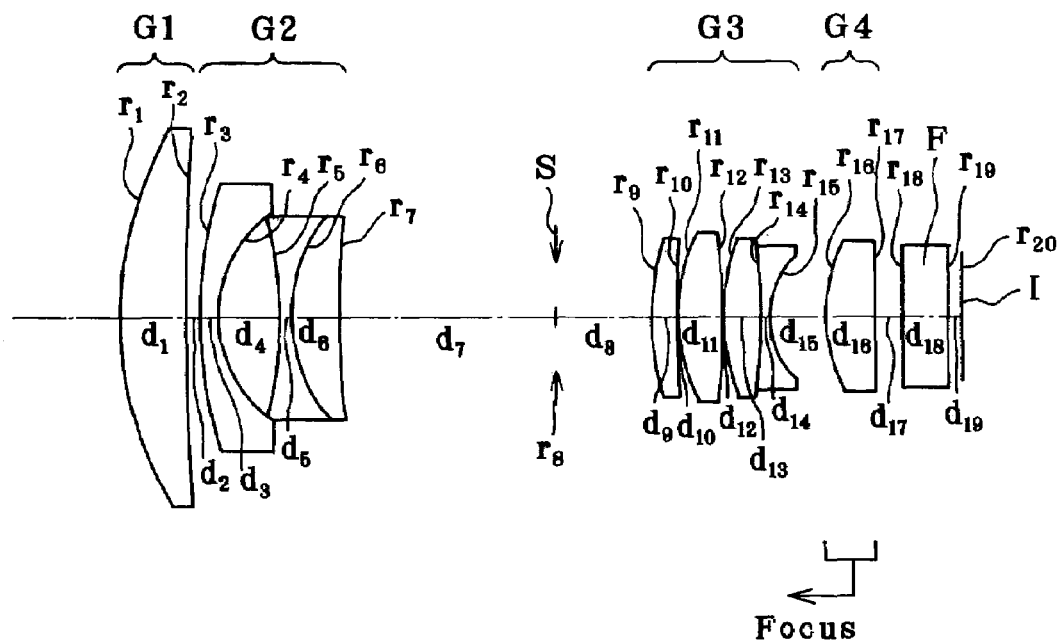
FIG. 3 is illustrative in section of Example 2 of the single-focus lens used with the taking apparatus of the invention upon focusing on an object at infinity.

Examples 1 and 2 of the zoom lens and single-focus lens used with the inventive taking system are now explained. FIG. 1 is illustrative in section of the zoom lens of Example 1 used with the taking apparatus of the invention at a wide-angle end (a), in an intermediate setting (b), and at a telephoto end (c) upon focusing on an object at infinity, and FIG. 3 is illustrative in section of the single-focus lens of Example 2 used with the taking apparatus of the invention upon focusing on an object at infinity. In FIGS. 1 and 3, G1 stands for the first lens unit, G2 the second lens unit, S an aperture stop, G3 the third lens unit, G4 the fourth lens unit, F a plane-parallel plate that forms a low-pass filter with an IR cut coating applied on it, etc., and I the imaging plane (light sensing plane) of an electronic imaging device such as a CCD or CMOS.

As depicted in FIG. 1, the zoom lens of Example 1 is made up of, in order from its object side, the first lens unit G1 having positive refracting power, the second lens unit G2 having negative refracting power, the aperture stop S, the third lens unit G3 having positive refracting power and the fourth lens unit G4 having positive refracting power. Upon zooming from a wide-angle end to a telephoto end, the first lens unit G1 and the aperture stop S remain fixed, the second lens unit G2 moves toward an image side, the third lens unit G3 moves toward the object side, and the fourth lens unit G4 moves toward the object side while the spacing between it and the third lens unit G3 becomes wide.

In order from the object side, the first lens unit G1 consists of one positive meniscus lens convex on its object side, the second lens unit G2 is composed of a negative meniscus lens convex on its object side, and a cemented lens consisting of a double-concave negative lens and a positive meniscus lens convex on its object side, the third lens unit G3 is comprised of a positive meniscus lens convex on its object side, a double-convex positive lens and a cemented lens consisting of a double-convex positive lens and a double-concave negative lens, and the fourth lens unit G4 consists of one positive meniscus lens convex on its object side.

Two aspheric surfaces are used: one for the surface located nearest to the object side in the third lens unit G3, and one for the surface on the object side in the fourth lens unit G4.

Focusing to a near distance here is implemented by the movement of the fourth lens unit G4. For focusing, the fourth lens unit G4 is moved along an optical axis toward the object side to detect contrast on the imaging plane I, and the position of the fourth lens unit G4 is fixed while the state where contrast becomes greatest is taken as a focusing state.

As depicted in FIG. 3, the single-focus lens of Example 2 is made up of, in order from its object side, the first lens unit G1 having positive refracting power, the second lens unit G2 having negative refracting power, the aperture stop S, the third lens unit G3 having positive refracting power and the fourth lens unit G4 having positive refracting power.

In order from the object side, the first lens unit G1 consists of one positive meniscus lens convex on its object side, the second lens unit G2 is composed of a negative meniscus lens convex on its object side and a cemented lens consisting of a double-concave negative lens and a positive meniscus lens convex on its object side, the third lens unit G3 is comprised of a positive meniscus lens convex on its object side, a double-convex positive lens and a cemented lens consisting of a double-convex positive lens and a double-concave negative lens, and the fourth lens unit G4 consists of one positive meniscus lens convex on its object side.

Two aspheric surfaces are used: one for the surface located nearest the object side in the third lens unit G3, and one for the object-side surface in the fourth lens unit G4.

Focusing to a near distance here is implemented by the movement of the fourth lens unit G4.

Set out below are numerical data about Examples 1 and 2. Note here that symbols referred to hereinafter but not hereinbefore have the following meanings: $\omega$ is a half angle of view, f is the focal length of the whole optical system, $F_{NO}$ is an F-number, WE is the wide-angle end, ST is an intermediate setting, TE is the telephoto end, $r_1$, $r_2$, ... is the radius of curvature of each lens surface, $d_1$, $d_2$, ... is a spacing between adjacent lens surfaces, $n_{d1}$, $n_{d2}$, ... is the d-line refractive index of each lens, and $v_{d1}$, $v_{d2}$, ... is the Abbe number of each lens. Here, let x be indicative of an optical axis provided that the direction of travel of light is positive, and y be indicative of a direction orthogonal to that optical axis. Then, aspheric surface configuration is given by $$x=(y^2/r)/[1+\{1-(K+1)(y/r)^2\}^{1/2}]+A_4y^4+A_6y^6+A_8y^8+A_{10}y^{10}+A_{12}y^{12}$$

Here, r is a radius of paraxial curvature, K is a conical coefficient, and $A_4$, $A_6$, $A_8$, $A_{10}$, and $A_{12}$ are the $4^{th}$, $6^{th}$, $8^{th}$, $10^{th}$, and $12^{th}$ aspheric coefficients, respectively.

EXAMPLE 1

| | | | |
|---|---|---|---|
| $r_1 = 22.693$ | $d_1 = 3.807$ | $n_{d1} = 1.48749$ | $v_{d1} = 70.23$ |
| $r_2 = 241.581$ | $d_2 = $ (Variable) | | |
| $r_3 = 25.064$ | $d_3 = 1.01$ | $n_{d2} = 1.84666$ | $v_{d2} = 23.78$ |
| $r_4 = 6.796$ | $d_4 = 3.75$ | | |
| $r_5 = -22.961$ | $d_5 = 0.78$ | $n_{d3} = 1.48749$ | $v_{d3} = 70.23$ |
| $r_6 = 8.805$ | $d_6 = 2.84$ | $n_{d4} = 1.84666$ | $v_{d4} = 23.78$ |
| $r_7 = 55.029$ | $d_7 = $ (Variable) | | |
| $r_8 = \infty$ (Stop) | $d_8 = $ (Variable) | | |
| $r_9 = 14.023$ (Aspheric) | $d_9 = 1.47$ | $n_{d5} = 1.58913$ | $v_{d5} = 61.30$ |
| $r_{10} = 99.844$ | $d_{10} = 0.16$ | | |
| $r_{11} = 10.398$ | $d_{11} = 2.53$ | $n_{d6} = 1.77250$ | $v_{d6} = 49.60$ |
| $r_{12} = -53.227$ | $d_{12} = 0.16$ | | |
| $r_{13} = 12.435$ | $d_{13} = 2.12$ | $n_{d7} = 1.74100$ | $v_{d7} = 52.64$ |
| $r_{14} = -78.311$ | $d_{14} = 0.75$ | $n_{d8} = 1.84666$ | $v_{d8} = 23.78$ |
| $r_{15} = 5.016$ | $d_{15} = $ (Variable) | | |
| $r_{16} = 10.015$ (Aspheric) | $d_{16} = 2.88$ | $n_{d9} = 1.69350$ | $v_{d9} = 53.22$ |
| $r_{17} = 2588.080$ | $d_{17} = $ (Variable) | | |
| $r_{18} = \infty$ | $d_{18} = 2.72$ | $n_{d10} = 1.51633$ | $v_{d10} = 64.14$ |
| $r_{19} = \infty$ | $d_{19} = 0.78$ | | |
| $r_{20} = \infty$ | | | |
| (Image pick-up plane) | | | |

Aspherical Coefficients

9 th surface $K = 1.005$
$A_4 = -9.8064 \times 10^{-5}$
$A_6 = -3.77082 \times 10^{-8}$
$A_8 = -3.46489 \times 10^{-8}$
$A_{10} = 1.30338 \times 10^{-9}$
$A_{12} = -1.73106 \times 10^{-11}$

16 th surface $K = 0.334$
$A_4 = -4.85216 \times 10^{-5}$
$A_6 = -6.92172 \times 10^{-7}$
$A_8 = 1.48559 \times 10^{-7}$
$A_{10} = -7.23748 \times 10^{-9}$
$A_{12} = 1.17804 \times 10^{-10}$

Zooming Data (∞)

| | WE | ST | TE |
|---|---|---|---|
| ω (°) | 32.03 | — | 12.07 |
| f (mm) | 5.75 | 10.88 | 16.00 |
| $F_{NO}$ | 1.83 | 2.18 | 2.60 |
| $d_2$ | 0.78 | 8.57 | 11.62 |
| $d_7$ | 12.67 | 4.87 | 1.83 |
| $d_8$ | 6.18 | 3.67 | 1.17 |
| $d_{15}$ | 3.42 | 4.97 | 6.36 |
| $d_{17}$ | 1.76 | 2.69 | 3.81 |

EXAMPLE 2

| | | | |
|---|---|---|---|
| $r_1 = 22.693$ | $d_1 = 3.807$ | $n_{d1} = 1.48749$ | $v_{d1} = 70.23$ |
| $r_2 = 241.581$ | $d_2 = 0.78$ | | |
| $r_3 = 25.064$ | $d_3 = 1.01$ | $n_{d2} = 1.84666$ | $v_{d2} = 23.78$ |
| $r_4 = 6.796$ | $d_4 = 3.75$ | | |
| $r_5 = -22.961$ | $d_5 = 0.78$ | $n_{d3} = 1.48749$ | $v_{d3} = 70.23$ |
| $r_6 = 8.805$ | $d_6 = 2.84$ | $n_{d4} = 1.84666$ | $v_{d4} = 23.78$ |
| $r_7 = 55.029$ | $d_7 = 12.67$ | | |
| $r_8 = \infty$ (Stop) | $d_8 = 6.18$ | | |
| $r_9 = 14.023$ (Aspheric) | $d_9 = 1.47$ | $n_{d5} = 1.58913$ | $v_{d5} = 61.30$ |
| $r_{10} = 99.844$ | $d_{10} = 0.16$ | | |
| $r_{11} = 10.398$ | $d_{11} = 2.53$ | $n_{d6} = 1.77250$ | $v_{d6} = 49.60$ |
| $r_{12} = -53.227$ | $d_{12} = 0.16$ | | |
| $r_{13} = 12.435$ | $d_{13} = 2.12$ | $n_{d7} = 1.74100$ | $v_{d7} = 52.64$ |
| $r_{14} = -78.311$ | $d_{14} = 0.75$ | $n_{d8} = 1.84666$ | $v_{d8} = 23.78$ |

EXAMPLE 2-continued

| | | | |
|---|---|---|---|
| $r_{15} = 5.016$ | $d_{15} = 3.42$ | | |
| $r_{16} = 10.015$ (Aspheric) | $d_{16} = 2.88$ | $n_{d9} = 1.69350$ | $v_{d9} = 53.22$ |
| $r_{17} = 2588.080$ | $d_{17} = 1.76$ | | |
| $r_{18} = \infty$ | $d_{18} = 2.72$ | $n_{d10} = 1.51633$ | $v_{d10} = 64.14$ |
| $r_{19} = \infty$ | $d_{19} = 0.78$ | | |
| $r_{20} = \infty$ | | | |
| (Image pick-up plane) | | | |

Aspherical Coefficients

9 th surface $K = 1.005$
$A_4 = -9.8064 \times 10^{-5}$
$A_6 = -3.77082 \times 10^{-8}$
$A_8 = -3.46489 \times 10^{-8}$
$A_{10} = 1.30338 \times 10^{-9}$
$A_{12} = -1.73106 \times 10^{-11}$

16 th surface $K = 0.334$
$A_4 = -4.85216 \times 10^{-5}$
$A_6 = -6.92172 \times 10^{-7}$
$A_8 = 1.48559 \times 10^{-7}$
$A_{10} = -7.23748 \times 10^{-9}$
$A_{12} = 1.17804 \times 10^{-10}$

| | |
|---|---|
| ω (°) | 32.03 |
| f (mm) | 5.75 |
| $F_{NO}$ | 1.83 |

In Example 1 mentioned above, the size (long-side direction×short-side direction) of the rectangular effective imaging area is 5.76 mm×4.32 mm; the effective area of the imaging plane is 24.88 mm², the pixel pitch is 0.002 mm in the long-side direction and 0.002 mm in the short-side direction, and the aperture stop S is a circular one in a full-aperture state.

And then, in the wide-angle end state, focusing-at-infinity state, and full-aperture state,
$S_e = 7.754$ mm²
$F = 5.75$ mm
$N = 6.22 \times 10^6$
$S_i = 24.88$ mm²
$\Phi_{emax} = 3.142$ mm
$\Phi_{emin} = 3.142$ mm
$\omega = 32.03°$ $(S_e/\pi)^{1/2}/f = 1/3.66$ \hfill (1)

$N = 6.22 \times 10^6$ \hfill (2)

$S_i = 24.88$ mm² \hfill (3)

$S_i/N = 4 \times 10^{-6}$ mm² \hfill (4)

$\Phi_{emax}/f = 1/1.83$ \hfill (5)

$\Phi_{emin}/\Phi_{emax} = 1$ \hfill (6)

$2\omega = 64.06°$ \hfill (7)

$2\omega = 64.06°$ \hfill (9)

In Example 2 mentioned above, the size (long-side direction×short-side direction) of the rectangular effective imaging area is 5.76 mm×4.32 mm; the effective area of the imaging plane is 24.88 mm², the pixel pitch is 0.002 mm in the long-side direction and 0.002 mm in the short-side direction, and the aperture stop S is a circular one in a full-aperture state.

And then, in the focusing-at-infinity state, and full-aperture state,
$S_e = 7.754$ mm²
$F = 5.75$ mm $N=6.22\times10^6$
$S_i=24.88$ mm$^2$
$\Phi_{emax}=3.142$ mm
$\Phi_{emin}=3.142$ mm
$\omega=32.03°$ $(S_e/\pi)^{1/2}/f=1/3.66$ (1)

$N=6.22\times10^6$ (2)

$S_i=24.88$ mm$^2$ (3)

$S_i/N=4\times10^{-6}$ mm$^2$ (4)

$\Phi_{emax}/f=1/1.83$ (5)

$\Phi_{emin}/\Phi_{emax}=1$ (6)

$2\omega=64.06°$ (7)

$2\omega=64.06°$ (9)

Figures 2A, 2B:
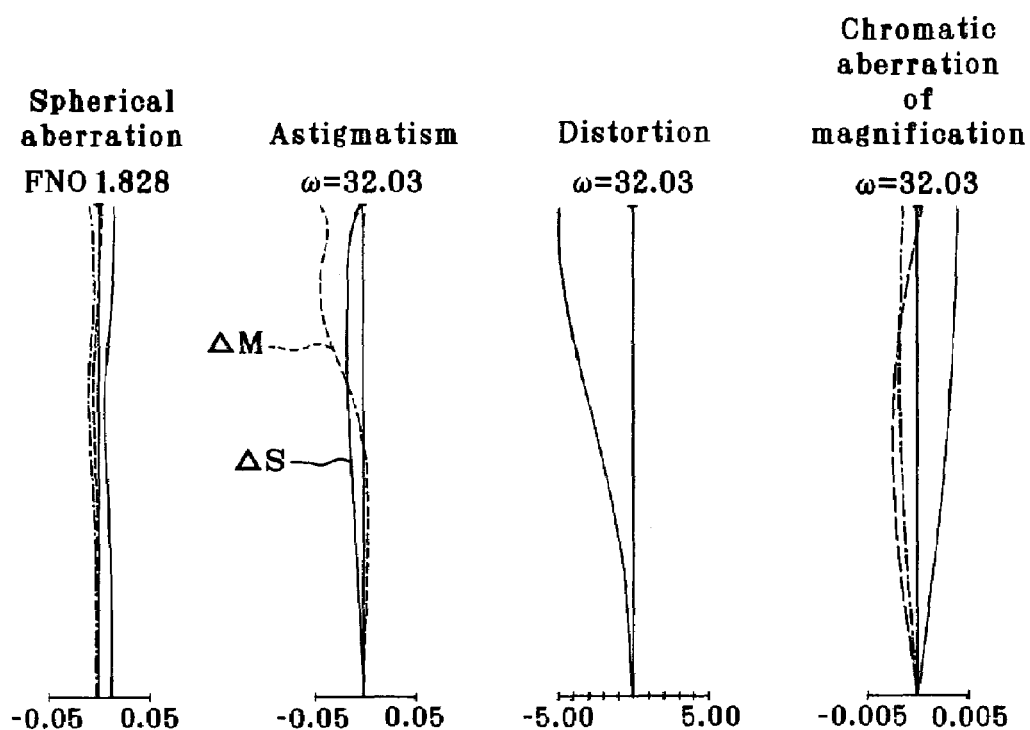
FIG. 2 is an aberration diagram for Example 1 upon focusing on an object at infinity.
Figure 4:
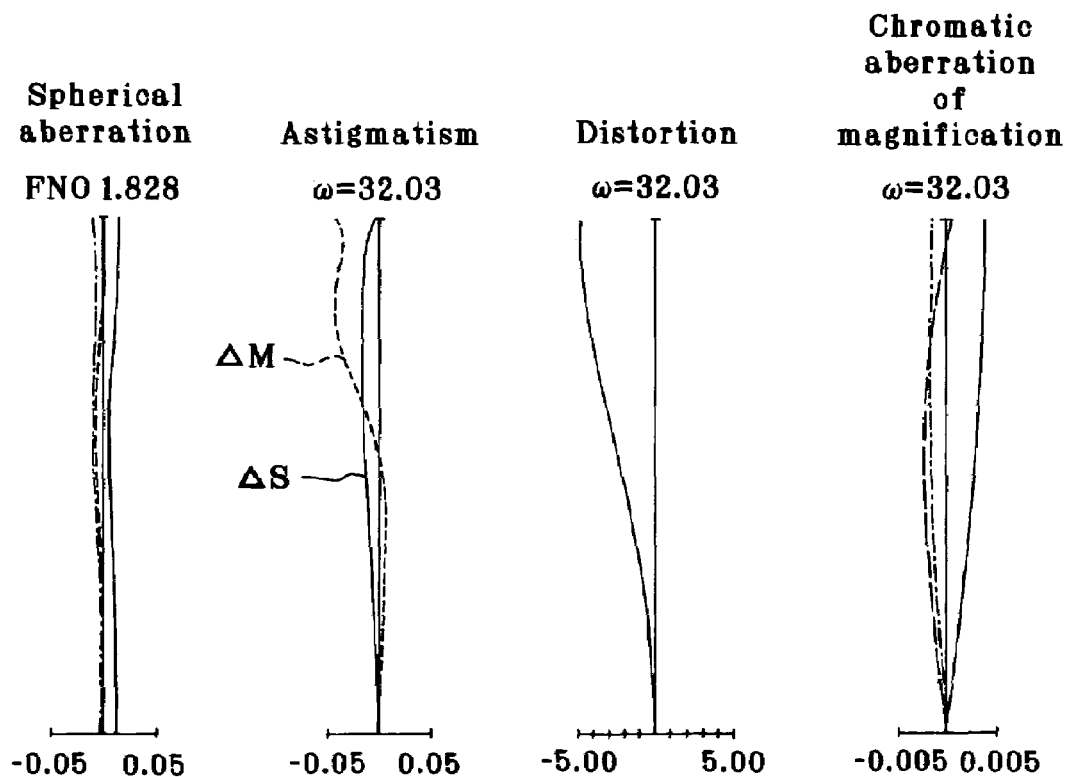
FIG. 4 is an aberration diagram for Example 2 upon focusing on an object at infinity.

FIG. 2 is an aberration diagram for Example 1 upon focusing on an object point at infinity. In the aberration diagram of FIGS. 2, (a) and (b) are indicative of spherical aberration, astigmatism, distortion and chromatic aberration of magnification at the wide-angle end, in an intermediate setting and at the telephoto end, respectively. FIG. 4 is an aberration diagram for Example 2 upon focusing on an object at infinity. In the aberration diagram of FIG. 4, there are spherical aberration, astigmatism, distortion and chromatic aberration of magnification indicated.

Figure 5:
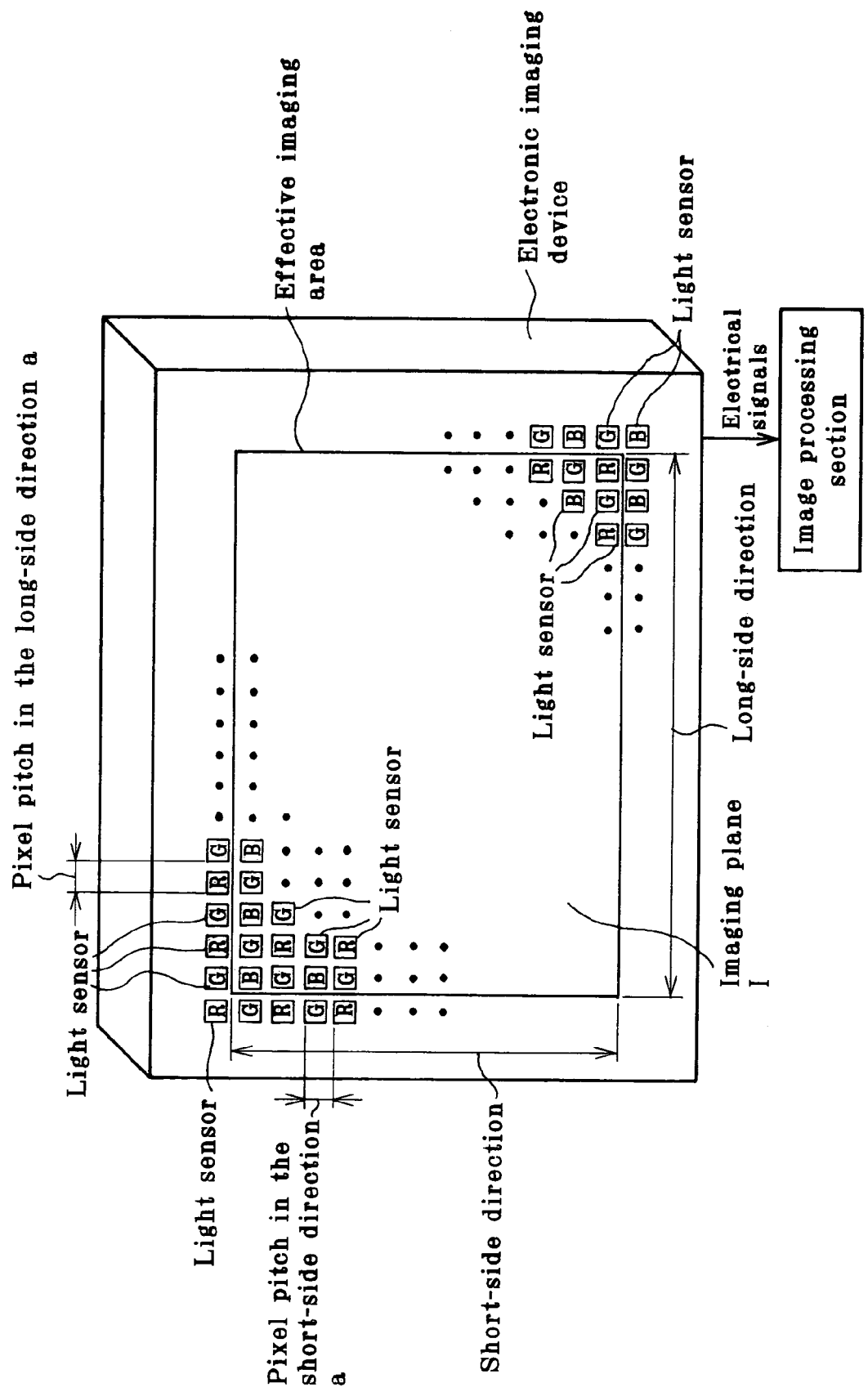
FIG. 5 is illustrative of one exemplary electronic imaging device used in Example 1, and 2.

The effective imaging plane and pixel pitch here are now explained. FIG. 5 is illustrative of one exemplary pixel arrangement of the electronic imaging device. As shown, light sensors corresponding to R (red), G (green) and B (blue) or light sensors corresponding to four colors cyan, magenta, yellow and green are mosaically located at a pixel pitch a.

The effective imaging area is understood to mean an area within an imaging plane on an electronic imaging device for the reproduction of a taken image (display output from a personal computer, printed output from a printer, etc.). The effective imaging area depicted in FIG. 5 is narrower than an area on which all the light sensors of the imaging device are located in compliance with the performance of the optical system (an image circle that can be gained depending on the performance of the optical system).

It should be noted that although the imaging range used for image reproduction may be variously varied, imaging apparatus having such functions has a variable effective imaging area. In such a case, the invention may as well be satisfied in any state.

The number, N, of effective pixels is understood to mean the number of pixels within this effective imaging area.

The effective area is understood to mean the area of this effective imaging area.

An image sensed by this electronic imaging device (CCD, CMOS or the like) is converted into electrical signals indicative of that image, and then guided to a signal processing section, not shown.

At the signal processing section, image controls such as gamma correction and contrast control are implemented.

Contrast changes due to the movement of the fourth lens unit G4 in Example 1 or 2 are read to detect contrast in the focusing area, and the fourth lens unit G4 is moved to the position at which the maximal contrast is obtained for focusing operation.

The present invention may be applied to an electronic taking apparatus wherein an object image is formed through the inventive zoom lens or single-focus lens, and then sensed by an imaging device such as CCD to implement taking, especially a digital camera or cellular phone, as embodied below.

Figure 6:
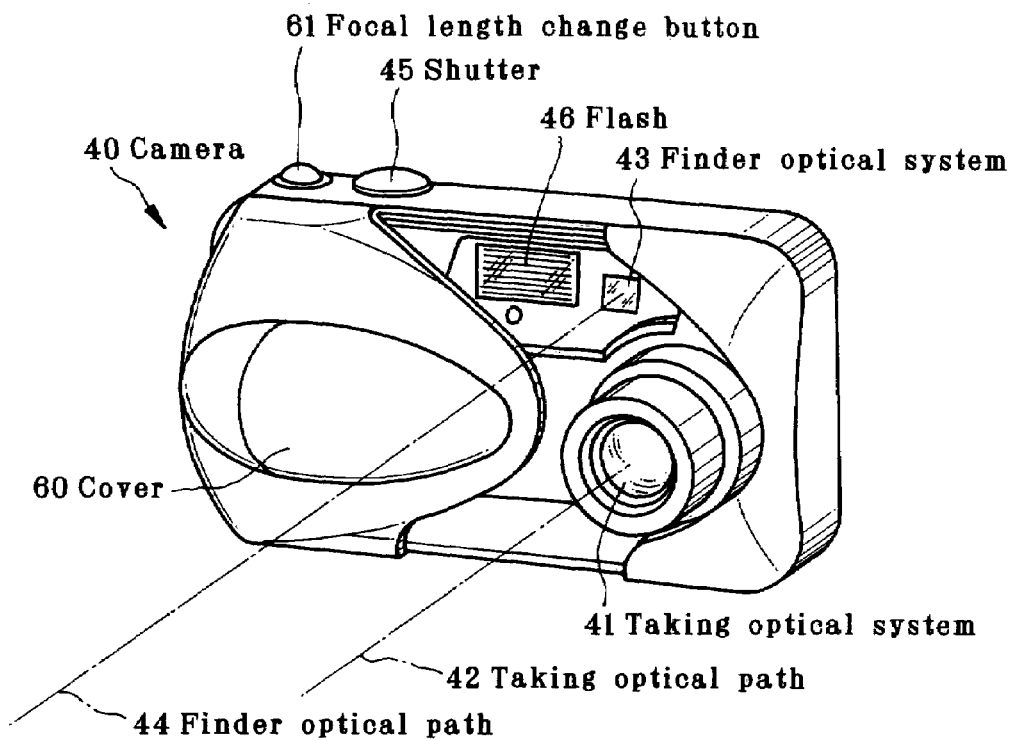
FIG. 6 is a front perspective view illustrative of the outside appearance of a digital camera with the inventive lens system built in it.
Figure 7:
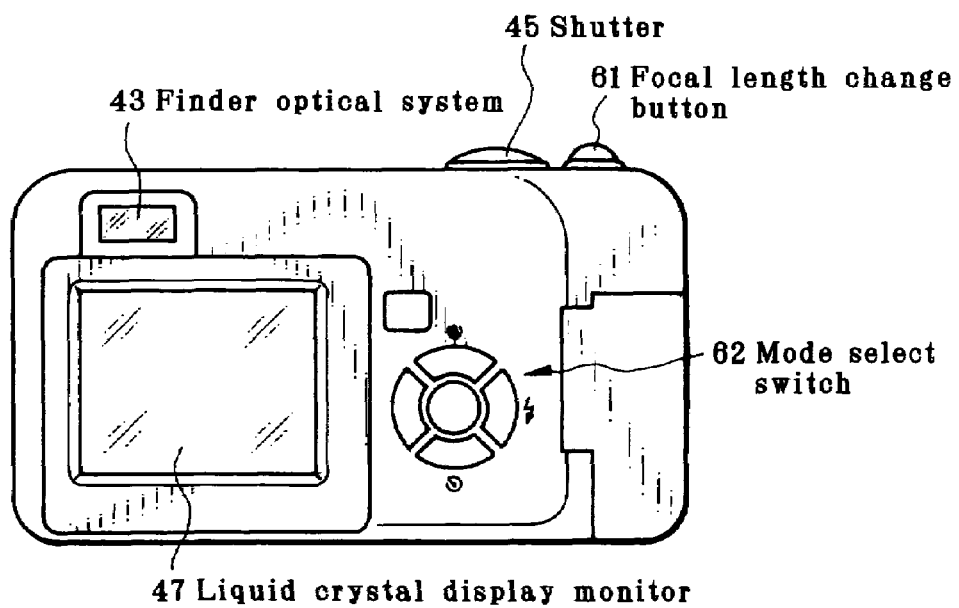
FIG. 7 is a rear perspective view of the digital camera of FIG. 6.
Figure 8:
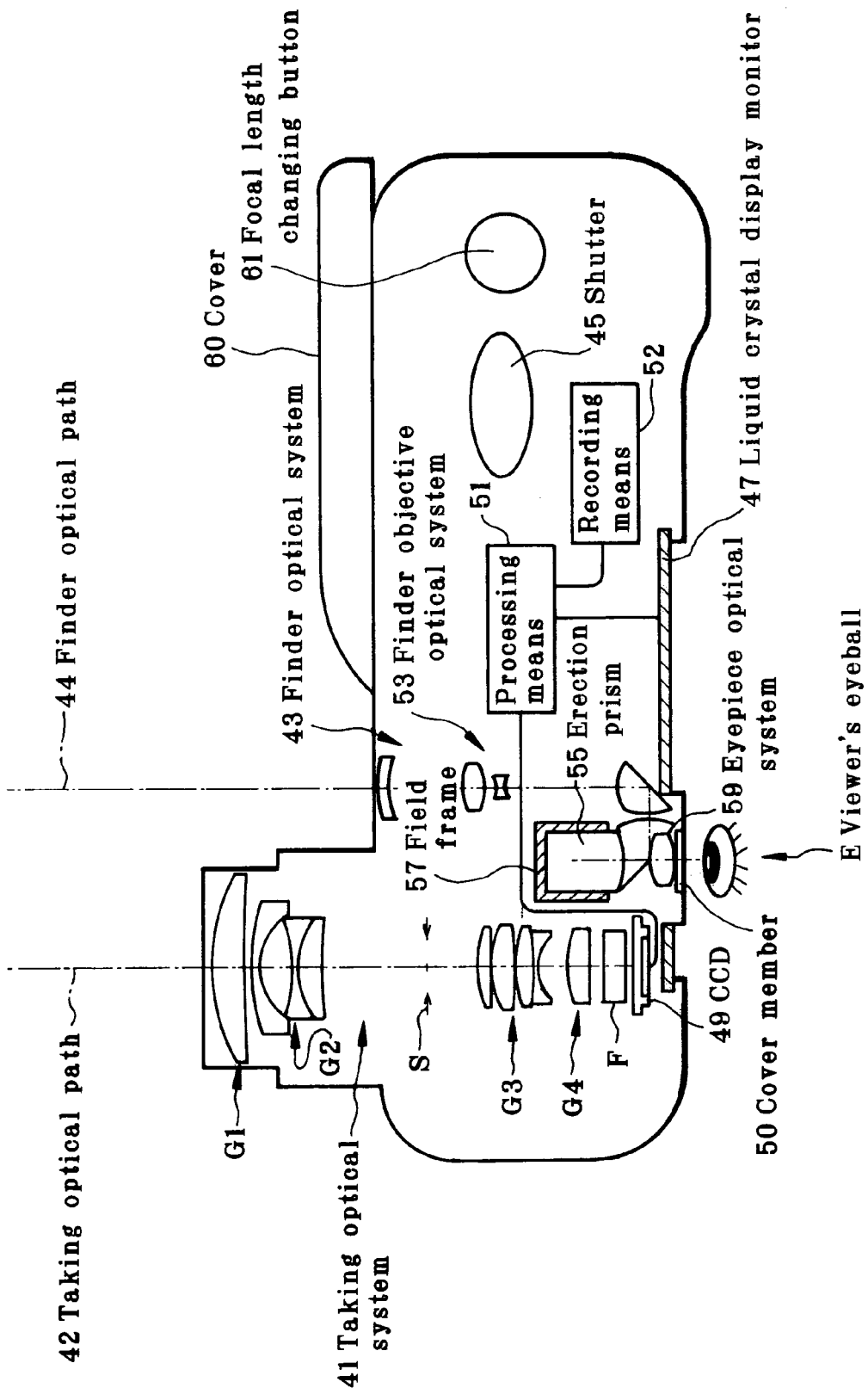
FIG. 8 is a sectional view of the digital camera of FIG. 6.

FIGS. 6, 7 and 8 are illustrative in conception of the construction of a digital camera, in which the inventive zoom lens or single-focus lens is built in its taking optical system 41. Specifically, FIG. 6 is a front perspective view of the appearance of a digital camera 40, FIG. 7 is a rear front view of the digital camera 40, and FIG. 8 is a schematic perspective plan view of the construction of the digital camera 40. Note here that FIGS. 6 and 8 show that the taking optical system 41 is housed in a camera body. In this embodiment, the digital camera 40 comprises a taking optical system 41 having a taking optical path 42, a finder optical system 43 having a finder optical path 44, a shutter 45, a flash 46, a liquid crystal display monitor 47, a focal length change button 61, a mode select switch 62 and so on. When the taking optical system 41 is housed in the camera body, a cover 60 is slid over the taking optical system 41, the finder optical system 43 and the flash 46. As the cover 60 is slid open to place the camera 40 in a taking mode, the taking optical system 41 is put out of the camera body, as shown in FIG. 8. Then, as the shutter 45 mounted on the upper side of the camera 40 is pressed down, it causes taking to be implemented through the taking optical system 41, for instance, the zoom lens of Example 1. An object image formed through the taking optical system 41 is formed on the imaging plane of CCD 49 via a plane-parallel plate such as a low-pass filter. The object image sensed by CCD 49 is displayed as an electronic image on the liquid crystal display monitor 47 mounted on the back surface of the camera via processing means 51. Note here that the processing means 51 could be connected with recording means 52 for recording the taken electronic image in it. Also note that the recording means 52 could be provided separately from the processing means 51 or, alternatively, it could be designed such that images are electronically recorded and written on a floppy disk, a memory card, an MO or the like. Further, a silver-halide film could be used in place of CCD 49 to set up a silver-halide camera.

Further, a finder objective optical system 53 is located on the finder optical path 44. The finder objective optical system 53 comprises a zoom optical system that is made up of a plurality of lens groups (three groups in the embodiment of FIGS. 6-8) and two prisms with its focal length variable in operable association with the zoom lens that is the taking optical-system 41. An object image formed through the finder objective optical system 53 is formed on a field frame 57 of an erection prism 55 that is an image-erecting member. In the rear of the erection prism 55, there is located an eyepiece optical system 59 for guiding an erected image into the eyeball E of the viewer. Note here that a cover member 50 is located on the exit side of the eyepiece optical system 59.

The thus assembled digital camera 40 can be improved in performance and reduced in size, because the taking optical system 41 is of high performance and small size, and can be housed in the digital camera body.

It should be noted that the single-focus lens of Example 2 may be used as the taking optical system 41.

Figure 9A:
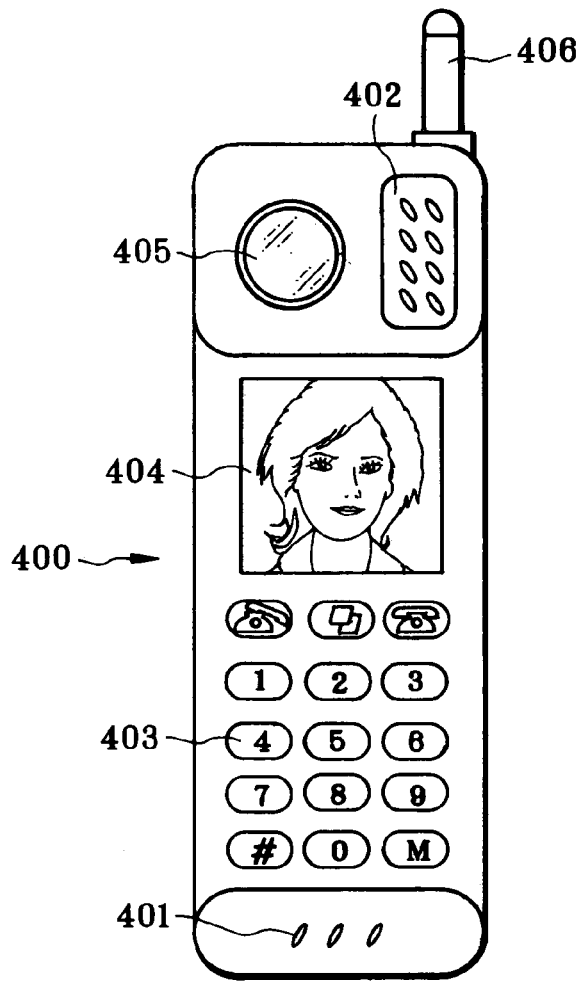
FIGS. 9(*a*) and 9(*b*) are a front and a side view of a cellular phone with the inventive lens system built as an objective optical system in it, and FIG. 9(*c*) is a sectional view of a taking optical system in it.
Figure 9B:
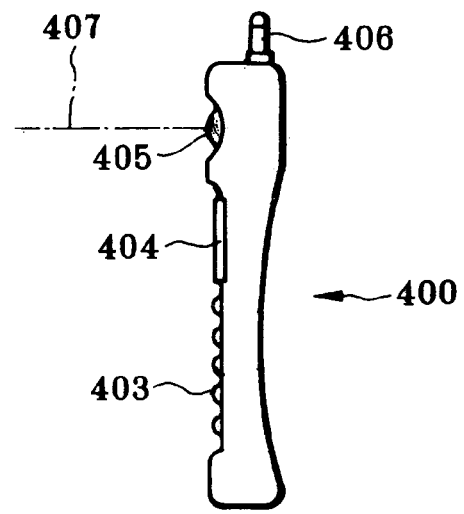
Figure 9C:
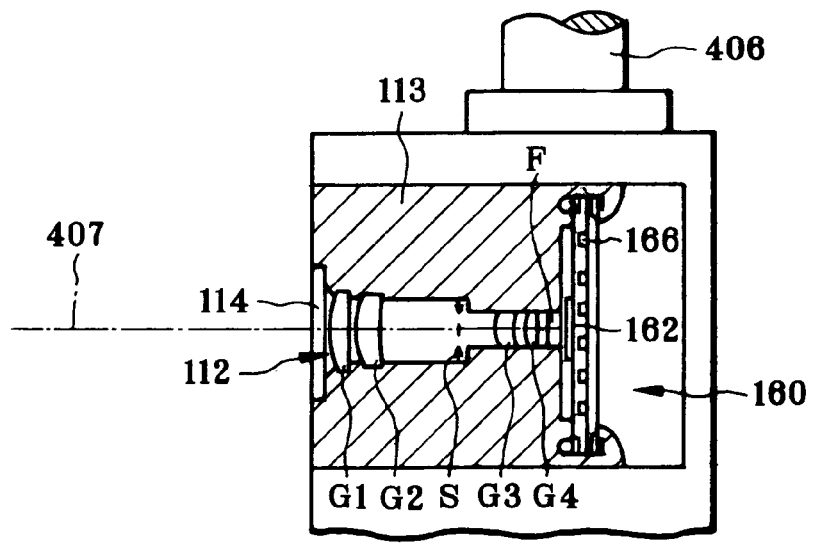

FIG. 9 is illustrative of a telephone set that is one exemplary information processor with the inventive zoom lens or single-focus lens built as a taking optical system in it, especially a convenient-to-carry cellular phone. Specifically, FIGS. 9(a) and 9(b) are a front and a side view of a cellular phone 400, and FIG. 9(c) is a sectional view of a taking optical system 405. As depicted in FIGS. 9(a), 9(b) and 9(c), the cellular phone 400 comprises a microphone portion 401 through which the voice of an operator is entered as information, a speaker 402 through which the voice of a person on the other end is produced, an input dial 403 through which information is entered by the operator, a monitor 404 for display images taken of the operator per se, the person on the other end of the line and so on as well as information such as telephone numbers, a taking optical system 405, an antenna 406 for transmission and reception of communications waves, and processing means (not shown) for processing image information, communications information, input signals, etc. For the monitor 404 here, a liquid crystal display is used. How the respective components are arranged is not particularly limited to the arrangement shown in FIG. 9. The taking optical system 405 comprises an objective lens 112 mounted on a taking optical path 407 and made up of the inventive zoom lens or single-focus lens (roughly shown), and an imaging device chip 162 for receiving an object image, which are built in the cellular phone 400.

In this embodiment, an optical low-pass filter F is additionally applied on the imaging device chip 162 to form a one-piece unit 160 that can be mounted at the rear end of the lens barrel 113 of the objective lens 112 in one-touch snap operation. Thus, any centering or surface-to-surface alignment for the objective lens 112 and imaging device chip 162 can be dispensed with, and so smooth assembling is achieved. Further, the lens barrel 113 is provided at the other end with a cover glass 114 for protection of the objective lens 112. It should be noted that the zoom lens drive mechanism in the lens barrel 113 is not shown.

An object image received at the imaging device chip 162 is entered into processing means (not shown) via a terminal 166, so that the image is displayed as an electronic image on the monitor 404 and/or a monitor on the other end of the line. To transmit the image to the person on the other end, the signal processing means has a signal processing function of converting information about the object image received at the imaging device chip 162 into transmittable signals.

I claim:

1. A taking apparatus, comprising a taking optical system and an electronic imaging device which is located on an image side of said taking optical system, includes an imaging plane with a plurality of two-dimensionally arranged light sensors, and is adapted to convert an image formed through said taking optical system into electrical signals, wherein the following conditions (1), (2), (3) and (4) are at the same time satisfied in at least one taking state:

$$1/2.8 > (S_e/\pi)^{1/2}/f > 1/4.4 \tag{1}$$

$$2.2 \times 10^6 < N < 13 \times 10^6 \tag{2}$$

$$5.5 \text{ mm}^2 < S_i < 32 \text{ mm}^2 \tag{3}$$

$$2 \times 10^{-6} \text{ mm}^2 < S_i/N < 16 \times 10^{-6} \text{ mm}^2 \tag{4}$$

where:
$S_e$ is an area of an entrance pupil of the taking optical system in at least one taking state,
f is a focal length of the taking optical system in said at least one taking state,
N is a number of effective pixels of the imaging plane in said at least one taking state, and
Si is a effective area of the imaging plane in said at least one taking state.

2. A taking apparatus, comprising a taking optical system, and an electronic imaging device which is located on an image side of said taking optical system, includes an imaging plane with a plurality of two-dimensionally arranged light sensors, and is adapted to convert an image formed through said taking optical system into electrical signals, wherein the following conditions (2), (3), (4), (5) and (6) are satisfied at the same time in at least one taking state:

$$1/1.4 > \Phi_{emax}/f > 1/2.2 \tag{5}$$

$$0.6 < \Phi_{emin}/\Phi_{emax} \leq 1 \tag{6}$$

$$2.2 \times 10^6 < N < 13 \times 10^6 \tag{2}$$

$$5.5 \text{ mm}^2 < S_i < 32 \text{ mm}^2 \tag{3}$$

$$2 \times 10^{-6} \text{ mm}^2 < S_i/N < 16 \times 10^{-6} \text{ mm}^2 \tag{4}$$

where, given a horizontal direction defined by a long-side direction and a vertical direction defined by a short-side direction of an effective imaging area of said imaging plane,
$\Phi_{emax}$ is a length of an entrance pupil in the longer of the horizontal and vertical directions,
$\Phi_{emin}$ is a length of an entrance pupil in the shorter of the horizontal and vertical directions,
f is a focal length of the taking optical system in said at least one taking state,
N is a number of effective pixels of said imaging plane in said at least one taking state, and
$S_i$ is a effective area of said imaging plane in said at least one taking state.

3. The taking apparatus according to claim 1 or 2, which satisfies the following condition (7) in said at least one taking state:

$$2\omega > 56.7° \tag{7}$$

where w is a half angle of view upon taking in said at least one taking state.

4. The taking apparatus according to claim 1 or 2, wherein said taking optical system satisfies the following condition (8):

$$1 \leq T_e/T_{max} \leq 0.85 \tag{8}$$

where $T_e$ is a transmittance of e-line wavelength, and
$T_{max}$ is a transmittance of a wavelength that becomes greatest among spectral transmittances of the taking optical system in a visible light region.

5. The taking apparatus according to claim 1 or 2, wherein said taking optical system is a taken optical system having a variable focus length, and said at least one taking state is a taking state where a focal length of said taking optical system becomes shortest.

6. The taking apparatus according to claim 5, wherein a value obtained by dividing the area of the entrance pupil by the focal length of said taking optical system is smaller in a state where said focal length becomes longest than in the state where said focal length becomes shortest.

7. The taking apparatus according to claim 1 or 2, wherein said taking optical system is adapted to make correction of a focusing position misalignment in compliance with a distance to a subject, and said at least one taking state is a taking state with focus on a subject nearest to infinity.

8. The taking apparatus according to claim 1 or 2, wherein said taking optical system is a zoom lens, and said at least one taking state satisfies the following condition (9):

$$75.4° > 2\omega > 56.7° \tag{9}$$

where ω is a half angle of view upon taking in said at least one taking state.

9. The taking apparatus according to claim 1, wherein said taking optical system is a zoom lens having a full angle of view of 56.7° or greater at a wide-angle end, and even when said at least one taking state has any full angle of view of 56.7° or greater, said conditions (1), (2), (3) and (4) are at the same time satisfied.

10. The taking apparatus according to claim 2, wherein said taking optical system is a zoom lens having a full angle of view of 56.7° or greater at a wide-angle end, and even when said at least one taking state has any full angle of view of 56.7° or greater, said conditions (2), (3), (4), (5) and (6) are at the same time satisfied.

11. The taking apparatus according to claim 9 or 10, where said zoom lens has a full angle of view of 75.4° or less at a wide-angle end.

12. The taking apparatus according to claim 1 or 2, wherein said taking optical system is a single-focus lens that satisfies the following condition (9):

$$75.4° > 2\omega > 56.7° \tag{9}$$

where $\omega$ is a half angle of view upon taking in said at least one taking state.

13. The taking apparatus according to claim 1 or 2, wherein said taking optical system is a taking optical system adapted to make automatic correction of a focusing position misalignment in compliance with a distance to a subject, and said at least one taking state is a taking state which satisfies the following condition (9), and in which focus is placed on a subject nearest to infinity:

$$75.4° > 2\omega > 56.7° \tag{9}$$

where $\omega$ is a half angle of view upon taking in said at least one taking state.

* * * * *